D. Pettengill.

Slide for Breast Straps.

No. 3,312. Reissued Feb. 23, 1869.

WITNESSES

T. F. McIntosh.

C. F. Churchill.

INVENTOR,

Dexter Pettengill

Assignee

Andrew Buckham

N. PETERS, PHOTO-LITHOGRAPHER, WASHINGTON, D. C.

United States Patent Office.

DEXTER PETTENGILL AND ANDREW BUCKHAM, OF DELHI, NEW YORK, ASSIGNEES, BY MESNE ASSIGNMENTS, OF DEXTER PETTENGILL.

*Letters Patent No.* 37,006, *dated November* 25, 1862; *reissue No.* 3,312, *dated February* 23, 1869.

IMPROVED SLIDE FOR BREAST-STRAPS FOR HARNESS.

The Schedule referred to in these Letters Patent and making part of the same.

*To all whom it may concern:*

Be it known that DEXTER PETTENGILL, of Delhi, in the county of Delaware, and State of New York, invented a new and useful Slide for the Breast-Straps of Harness; and we do hereby declare that the following is a full and exact description thereof, reference being had to the accompanying drawings, and to the letters of reference marked thereon, making a part of this specification, in which—

Figure 1:
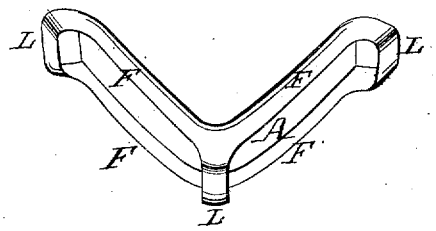
Figures 1 and 4 are perspective views of the slide.
Figure 2:
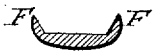
Figure 2 is a transverse section of the body of the slide.
Figure 3:
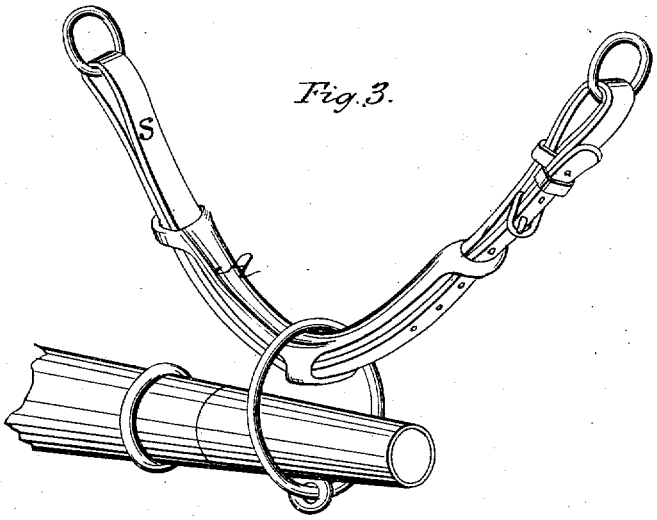
Figure 3 is a perspective view of the slide as applied to the breast-strap.
Figure 4:
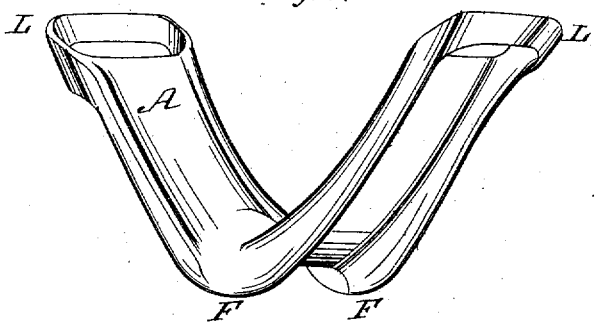

The nature of this invention consists of a metallic slide, figs. 1 and 4, applied to, or combined with the breast-strap of a harness, as shown in fig. 3, for the purpose of protecting the breast-strap from being abraded and worn by the ring of the neck-yoke or pole-chain.

The slide is made of different sizes, according to the width of the breast-strap on which it is to be used, and is provided with two or more loops marked L, as shown in the drawings, through which the breast-strap passes, and which retain the slide upon the breast-strap S, as shown in fig. 3.

The slide is also provided, on each side, with a flange marked F, or the body of the slide may be curved transversely, so as to form flanged edges, as shown in the drawings.

The use of these flanges, or flanged edges, is for the better protection of the edges of the breast-strap, as also to increase the strength of the slide, and aid in keeping it in its proper position on the breast-strap.

The curve or angle of the slide in which the ring of the neck-yoke or pole-chain rests, may be made more or less acute, according to the length of the breast-strap used.

A curve made to suit a breast-strap of medium length will generally practically suit any ordinary length of breast-strap, care being taken that the slide is sufficiently rounded at the angle, to prevent it from abrading the breast-strap when the strain comes upon it.

What we claim as new, and desire to secure by Letters Patent, is—

The metallic slide, and its application to the breast-straps of harness, in the manner and for the purposes set forth in the above specification.

DEXTER PETTENGILL.
ANDREW BUCKHAM.

Witnesses:
T. F. McINTOSH,
C. F. CHURCHILL.